United States Patent [19]

Beckstead et al.

[11] Patent Number: 4,963,336
[45] Date of Patent: Oct. 16, 1990

[54] PURIFICATION OF APT

[75] Inventors: Leo W. Beckstead, Arvada, Colo.; Tom C. Kearns, Donnellson, Iowa; Eddie C. Chou, Arvada, Colo.

[73] Assignee: AMAX Inc., New York, N.Y.

[21] Appl. No.: 412,062

[22] Filed: Sep. 25, 1989

[51] Int. Cl.⁵ .............................................. C01G 41/00
[52] U.S. Cl. ........................................ 423/56; 423/53; 423/55; 423/593; 423/606
[58] Field of Search ...................... 423/53, 55, 56, 593, 423/606

[56] References Cited

U.S. PATENT DOCUMENTS

| | | | |
|---|---|---|---|
| 2,893,832 | 7/1959 | Loung | 423/593 |
| 4,092,400 | 5/1978 | Zbranek et al. | 423/56 |
| 4,115,513 | 9/1978 | Kulkarni et al. | 423/56 |
| 4,168,296 | 9/1979 | Lundquist | 423/56 |
| 4,623,534 | 11/1986 | Scheithauer et al. | 423/93 |

FOREIGN PATENT DOCUMENTS

| | | | |
|---|---|---|---|
| 695570 | 10/1964 | Canada | 423/56 |
| 1053483 | of 1959 | Fed. Rep. of Germany | 423/56 |
| 389027 | 11/1973 | U.S.S.R. | 423/56 |
| 0459116 | 7/1982 | U.S.S.R. | 423/55 |
| 1011531 | 4/1983 | U.S.S.R. | 423/55 |
| 912929 | 12/1962 | United Kingdom | 423/56 |

Primary Examiner—Robert L. Stoll
Assistant Examiner—Steven J. Bos
Attorney, Agent, or Firm—Michael A. Ciomek; Eugene J. Kalil

[57] ABSTRACT

Directed to a process for producing a tungsten product of enhanced purity from ammonium paratungstate (APT) with a minimum number of processing steps which comprises mixing the APT with an ammonium solution, autoclaving the mixture at a temperature above the boiling point thereof to dissolve the APT and recrystallizing APT from the solution to yield an APT product of enhanced marketability.

7 Claims, 2 Drawing Sheets

PURIFICATION OF APT

BACKGROUND OF THE INVENTION

Tungsten metal products are made using a chemically refined intermediate ammonium paratungstate (APT) product. APT is produced by processing tungsten concentrates containing scheelite (calcium tungstate) or wolframite (iron/manganese tungstate). The processing steps usually include several impurity removal steps to make an APT product of the desired purity.

Commercially, two general approaches typically are being used for APT production: (1) digestion in basic solution, and (2) digestion in strong acids. In the basic leaching processes, tungsten concentrates are digested with caustic and/or soda ash solutions. The resulting solution is subjected to a series of purification stages for P, As, and Mo removal. The purified $Na_2WO_4$ solution is then converted into APT by solvent extraction and crystallization. In the acid leaching processes, tungsten concentrates are leached with strong hydrochloric acid which solubilizes impurities and precipitates crude tungstic acid. The resulting tungstic acid is washed and dissolved in ammonia solution prior to crystallization of APT. The APT product is then thermally decomposed and reduced to produce tungsten metal. The purity of the tungsten metal is directly proportional to the purity of the APT from which it is made.

The final step in production of APT using either of the above methods is crystallization of APT from ammonium tungstate solution. The crystallization step is an important part of the process, since many impurities concentrate in the crystallizer mother liquor and do not crystallize with the APT.

Both processing methods can produce 99.95 to 99.99 percent APT. This purity of APT has been used in the production of tungsten carbide, tungsten-containing catalyst, ferrotungsten and tungsten filament. Because of technological advances, high purity tungsten is in demand in various catalyst, electric, and electronic applications. In order to up-grade three-nine or four-nine purity APT, redissolution and recrystallization has been used.

Chemically, the crystallized APT is not readily soluble in ammonia solutions. In order to up-grade an APT product, the APT has to be either (1) processed through caustic dissolution, impurity removal, solvent extraction and recrystallization stages, or (2) calcined at 350° to 600° C. to form yellow oxide. The more soluble yellow oxide is then dissolved in ammonia solution prior to recrystallization of APT. Sometimes, several processing cycles are performed in order to obtain five-nine and six-nine APT products. These approaches are labor and cost intensive, and also tungsten yield may be low.

In a tungsten facility that produces APT, there are several stages in the operation where APT may form that is not the proper particle size or purity to be included in the normal production. When APT is made in a continuous crystallizer, some of the crystallized product is too fine to include in the production material that is sold. This material is packaged separately from product and is labeled as dust. Dust typically must be recycled. Also, in normal operations, some APT product may be made that does not meet required purity specifications. This APT may be sold at a discount, or if it can not be sold it must be recycled in the process. Each of these products contributes to recycle in a tungsten operation that increases operating costs. If the APT-containing solids could be redissolved in ammonia, recycled material could be inserted at an intermediate point in the process rather than at the head end, costs would be decreased, and overall output would increase.

In the present invention, conditions with regard to temperature and ammonia concentrations for direct dissolution of APT have been defined. The advantages of the invention include:

1. Recycle of off-grade APT or APT fines is minimized by direct dissolution and recrystallization in ammonia solution, and
2. Dissolution and recrystallization of off-grade or normal APT product yields a purer product in a simple purification process. High-purity APT can be produced with fewer processing steps.

SUMMARY OF THE INVENTION

In accordance with the invention, an APT product, which may be off-grade APT, such as dust, is recovered in a state of enhanced purity with few processing steps by mixing such APT with an ammonia solution containing about 2.5% to 12%, by weight, $NH_3$ and auto claving the mixture at a temperature exceeding the boiling point to dissolve the APT solids. The solutions may then be used in a crystallizer to produce APT crystals and while rejecting impurities.

Figure 1:
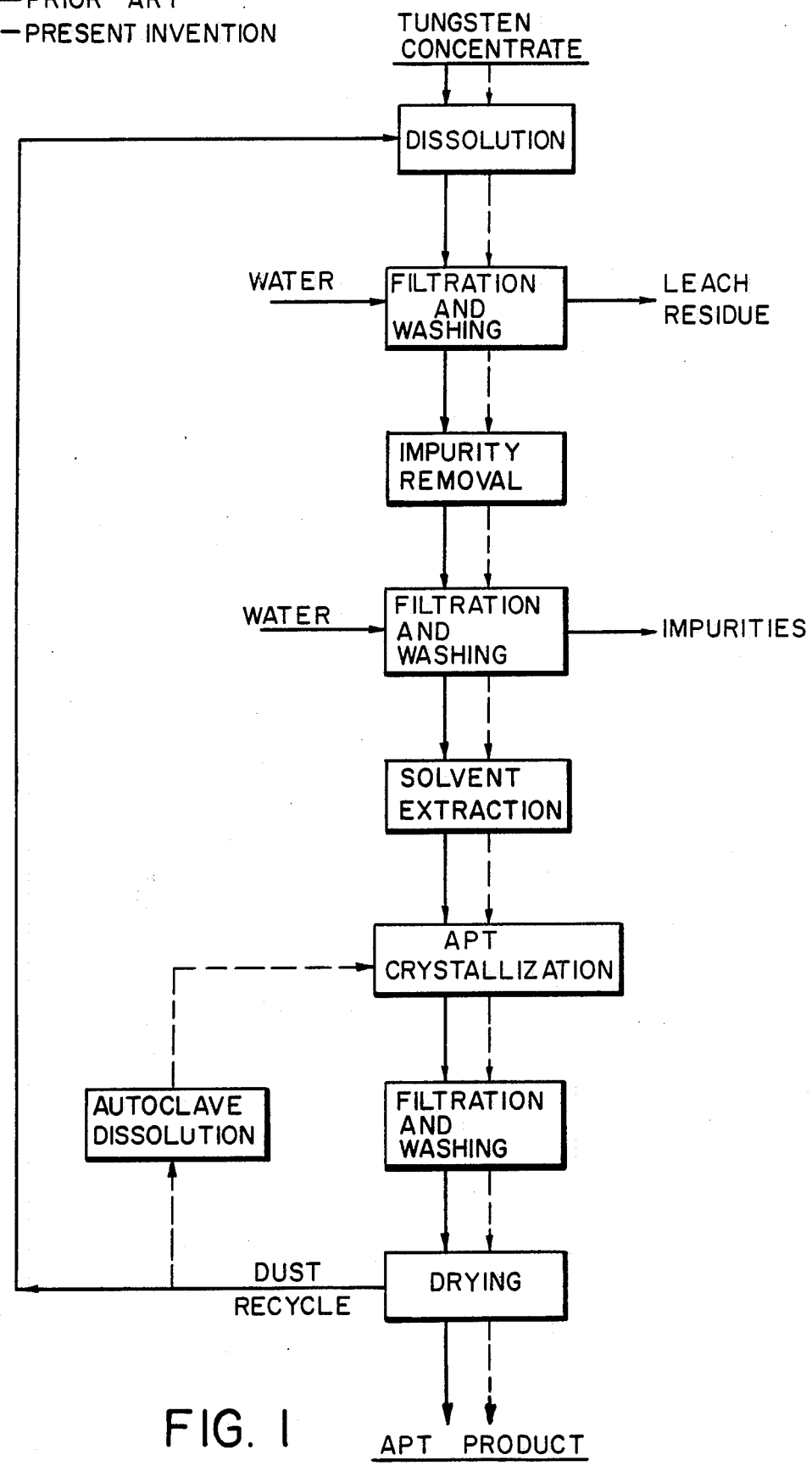
FIG. 1 is a flowsheet comparing the known process for producing APT from tungsten concentrate with the improved process of the invention.
Figure 2:
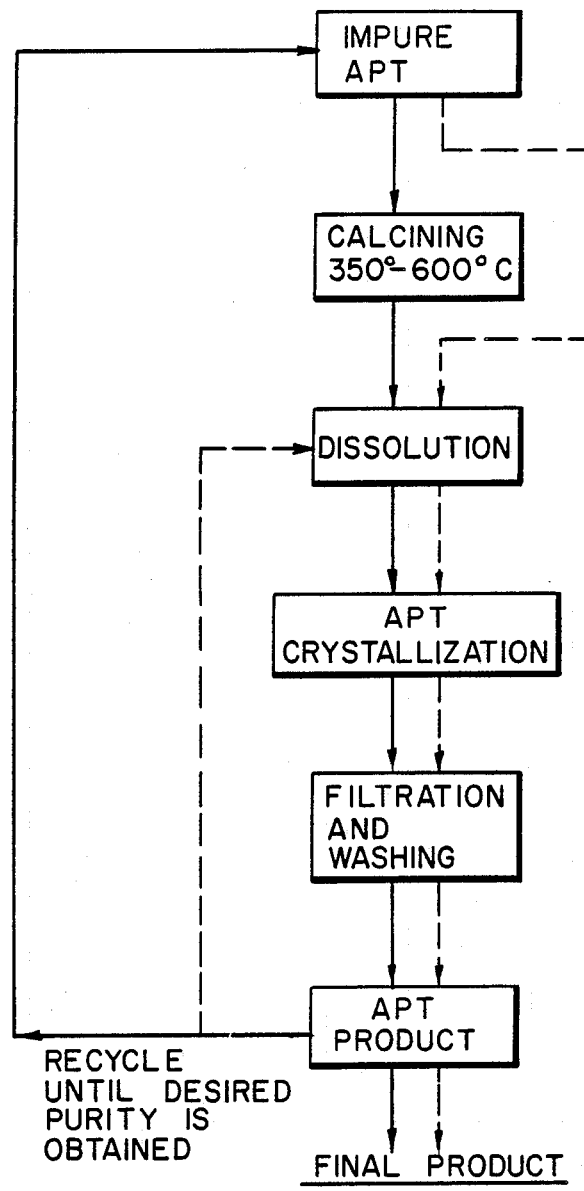
FIG. 2 is a flowsheet comparing the known process for producing APT of enhanced purity from impure APT with the improved process of the invention.

The invention will be more fully described in the following Examples.

EXAMPLE 1

APT Dust Dissolution

Tests were conducted by preparing 1000 ml of solution containing varying ratios of water and reagent ammonium hydroxide solution. The ammonium hydroxide solution contained 24.6 percent by weight $NH_3$ (about 13 normal $NH_3$). A weighed amount of APT dust or APT was added to the solution in an autoclave. The autoclave was closed and heated to the desired temperature. The timing of the test began when the preprogrammed temperature was reached. At the conclusion of the test, the autoclave was cooled and the solution or slurry was filtered. The remaining APT (if any) was dried and weighed. The specific gravity of the solution was measured and the solution was analyzed for $WO_3$. Results of tests run using APT dust are presented in Table 1.

TABLE 1

APT Dust Dissolution Test Results

| Test No. | Temp. °C. | Time Hrs. | Reagent NH$_4$OH ml | Water ml | Feed Sol. NH$_3$, % | APT, grams Feed | APT, grams Residue | Solutions S.G. | Solutions WO$_3$, g/l |
|---|---|---|---|---|---|---|---|---|---|
| APT-D1   | 110 | 6     | 1000 | 0   | 24.6 | 150 | 91.3  | 0.96 | 48  |
| APT-D2   | 110 | 6     | 500  | 500 | 12.3 | 150 | 0     | 1.05 | 121 |
| APT-D3   | 110 | 6     | 500  | 500 | 12.3 | 250 | 33.2  | 1.09 | 161 |
| APT-D4   | 90  | 6     | 500  | 500 | 12.3 | 250 | 150.3 | 1.03 | 76  |
| APT-D5   | 110 | 2     | 500  | 500 | 12.3 | 250 | 127.6 | 1.03 | 96  |
| APT-D6   | 90  | 16    | 500  | 500 | 12.3 | 250 | 92.5  | 1.05 | 127 |
| APT-D7   | 110 | 6     | 333  | 667 | 8.2  | 250 | 0     | 1.14 | 191 |
| APT-D8   | 100 | 6     | 500  | 500 | 12.3 | 250 | 115.8 | 1.04 | 96  |
| APT-D9A  | 100 | 6     | 200  | 800 | 4.9  | 250 | 0     | 1.16 | 203 |
| APT-D9B  | 100 | 2     | 200  | 800 | 4.9  | 250 | 9.6   | 1.15 | 190 |
| APT-D10  | 125 | 6     | 500  | 500 | 12.3 | 250 | 0     | 1.14 | 202 |
| APT-D11A | 110 | 6     | 200  | 800 | 4.9  | 325 | 0     | 1.22 | 249 |
| APT-D11B | 110 | 2     | 200  | 800 | 4.9  | 325 | 49.9  | 1.16 | 194 |
| APT-D12  | 120 | 2     | 200  | 800 | 4.9  | 325 | 0     | 1.22 | 252 |
| APT-D13  | 170 | 5 min | 500  | 500 | 12.3 | 250 | 79    | 1.07 | 126 |
| APT-D14  | 170 | 5 min | 333  | 667 | 8.2  | 250 | 0.5   | 1.14 | 184 |
| APT-D15  | 170 | 5 min | 200  | 800 | 4.9  | 325 | 25    | 1.19 | 227 |
| APT-D16  | 170 | 5 min | 100  | 900 | 2.5  | 325 | 114.4 | 1.10 | 132 |

NH$_3$ is listed in weight percent.

EXAMPLE 2

Effect of Ammonia Concentration

Table 2 shows a summary of tests run at two different temperatures that illustrates the effect of initial ammonia concentration on APT dust dissolution. In the first sequence of tests run at 10° C, dust dissolution increased as the initial ammonia concentration decreased. The first test in the series (APT-D1) was run using reagent ammonia solution. The solution after 6 hours contained 48 g/l WO$_3$. The last test in the sequence (APT-D11A) was run using 1 part reagent ammonia and 4 parts water. The solution contained 249 g/l WO$_3$ after 6 hours.

Additional information on the effect of ammonia concentration is provided by the second sequence of tests run at 170° C. shown in Table 2. The same trends that were observed at 110° C. with regard to the effect of initial ammonia concentration are observed at 170° C. However, test APT-D16 shows that a solution containing 1 part ammonia and 9 parts water (2.5 percent NH$_3$) did not solubilize dust as effectively as the solution containing 4.9 percent NH$_3$. These results show that as the temperature was increased to 170° C., dust dissolution was significant at short reaction times.

The results indicate that the optimum NH$_3$ concentration for dust dissolution is about 4.9 percent NH$_3$ concentration. Based on the amount of tungsten dissolved, this ammonia addition represents about 1.55 times the amount required to form ammonium tungstate (where 2 moles of NH$_3$ combine with one mole of WO$_3$). This approximate calculation is based on the ammonia added from the reagent and the ammonia present in the APT dust.

TABLE 2

| Test No. | Temp. °C. | Time, hrs. | NH$_3$ Concentration, wt. % | Product Solution Spec. Gravity | Product Solution WO$_3$, g/l |
|---|---|---|---|---|---|
| APT-D1   | 110 | 6     | 24.6 | 0.96 | 48  |
| APT-D3   | 110 | 6     | 12.3 | 1.09 | 161 |
| APT-D7   | 110 | 6     | 8.2  | 1.14 | 191 |
| APT-D11A | 110 | 6     | 4.9  | 1.22 | 249 |
| APT-D13  | 170 | 5 min | 12.3 | 1.07 | 126 |
| APT-D14  | 170 | 5 min | 8.2  | 1.14 | 184 |
| APT-D15  | 170 | 5 min | 4.9  | 1.19 | 227 |
| APT-D16  | 170 | 5 min | 2.5  | 1.10 | 132 |

EXAMPLE 3

Effect of Temperature

Table 3 shows the effects of reaction temperature at different reaction times. In the first sequence of tests, dust dissolution decreased as the reaction temperature was decreased from 125° to 90° C. The second sequence of tests showed a similar trend. Both sets of test results show that dust dissolution is extensive at about 120° C.

TABLE 3

| Test No. | Temp. °C. | Time, hrs. | NH$_3$ Concentration, wt. % | Product Solution Spec. Gravity | Product Solution WO$_3$, g/l |
|---|---|---|---|---|---|
| APT-D10 | 125 | 6 | 12.3 | 1.14 | 202 |
| APT-D3  | 110 | 6 | 12.3 | 1.09 | 161 |
| APT-D8  | 100 | 6 | 12.3 | 1.04 | 96  |
| APT-D4  | 90  | 6 | 12.3 | 1.03 | 76  |
| APT-D12 | 120 | 2 | 4.9  | 1.22 | 252 |

TABLE 3-continued

| Test No. | Temp. °C. | Time, hrs. | NH₃ Concentration, wt. % | Product Solution Spec. Gravity | WO₃, g/l |
|---|---|---|---|---|---|
| | | | Effect of Temperature on APT Dust Dissolution | | |
| APT-D11B | 110 | 2 | 4.9 | 1.16 | 194 |

EXAMPLE 4

APT Dissolution

Using conditions established for dust dissolution, a few tests were run using APT product as feed. Test results are summarized in Table 4. Comparison of these results with those obtained using APT dust show that either dust or product can be dissolved at similar conditions of ammonia concentration and reaction temperature and time.

TABLE 4

APT Dissolution Test Results

| Test No. | Temp. °C. | Time Hrs. | Reagent NH₄OH ml | Water ml | Feed Sol. NH₃, % | APT, grams Feed | APT, grams Residue | Solution S.G. | Solution WO₃, g/l |
|---|---|---|---|---|---|---|---|---|---|
| APT-P1 | 110 | 2 | 200 | 800 | 4.9 | 325 | 84 | 1.16 | 199 |
| APT-P2 | 120 | 2 | 200 | 800 | 4.9 | 325 | 0 | 1.21 | 262 |
| APT-P3 | 120 | 1 | 200 | 800 | 4.9 | 325 | 17 | 1.21 | 247 |
| APT-P4 | 120 | 2 | 333 | 667 | 8.2 | 325 | 38 | 1.16 | 213 |

NH₃ is listed in weight percent.

In summary APT (or off-grade APT) and APT dust can be dissolved to obtain solutions containing greater than 250 g/l WO₃ at relatively mild conditions. At 120° C., 2 hours were required to completely dissolve 325 grams of APT or APT dust, which produced solutions containing 252 to 262 g/l WO₃ at specific gravity of 1.22. The APT was dissolved in a solution containing 4.9 percent by weight ammonia (about 2.8 normal NH₃). The pressure in the dissolving vessel typically ranged from 35 to 54 psi.

EXAMPLE 5

Recrystallized APT

Tests were run to investigate the production of high-purity APT from solution prepared by dissolving APT dust in ammonia solution. Three hundred grams of APT dust was dissolved completely in 1000 ml of 4.9 percent ammonia solution at 120° C. and 2 hours retention time. The solution was then boiled to recover about 81 percent of the tungsten in solution as APT. A sample of solids was taken for analysis and the remaining solids were redissolved in ammonia at 120° C. The resulting solution was again boiled to recover about 81 percent of the tungsten as APT. The analyses of the feed APT and the two products are shown in Table 5. The results show that a significant improvement in the purity of the APT was obtained in the recrystallization process. Sodium, arsenic, iron, fluoride, and phosphorus levels were lowered.

TABLE 5

Purity of Recrystallized APT

| Product | Analysis, ppm Na | As | Fe | F | P |
|---|---|---|---|---|---|
| Feed APT | 4 | 54 | 6 | 5 | 15 |
| 1st Cryst. | 2 | 5 | 2 | 2 | 9 |
| 2nd Cryst. | <1 | 1 | <1 | 1 | 4 |

Test results indicate that APT purity can be controlled by the percentage of recrystallization in each dissolution-crystallization cycle and by the number of cycles. Generally, the purity of the product increases with each recycle stage. Purity also typically increases if the extent of recovery in the recrystallization step is decreased.

Although the present invention has been described in conjunction with preferred embodiment, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. The process for testing a solid ammonium paratungstate (APT) product using a minimum number of process operations which comprises mixing said APT with aqueous ammonia solution containing about 2.5% to about 12%, by weight, NH₃, and autoclaving said mixture at a temperature above the boiling point therefor for a time sufficient to dissolve substantially all of said APT, and recrystallizing solid APT from said solution.

2. The process in accordance with claim wherein said temperature is at least about 110° C. and said NH₃ concentration is about 2.5% to about 12%, by weight.

3. The process in accordance with claim wherein said NH₃ concentration is about 4.9%, by weight.

4. The process in accordance with claim 3 wherein the tungsten content of said APT solution resulting from autoclaving is at least about 200 gpl as WO₃.

5. The process in accordance with claim 3 wherein the tungsten content of said APT solution resulting from autoclaving is at least about 250 gpl as WO₃.

6. The process in accordance with claim 1 wherein said initial APT product is an off-grade product.

7. In the process for recovering tungsten from a tungsten concentrate wherein the tungsten content of said concentrate is separated therefrom, purified and converted into solid ammonium paratungstate (APT) by crystallization from ammoniacal solution, of which a portion is off-grade material, the improvement for recovering said off-grade APT with a minimum number of processing cycles which comprises mixing said off-grade APT with an ammonia solution containing about 2.5% to about 12%, by weight, of NH₃ and autoclaving said mixture at a temperature above the boiling point thereof for a time sufficient to dissolve substantially all of said APT and recrystallizing solid APT from the resulting solution to yield a solid APT product.

* * * * *